(12) United States Patent
Maeda et al.

(10) Patent No.: US 10,470,280 B2
(45) Date of Patent: *Nov. 5, 2019

(54) COMMUNICATIONS DEVICE AND COMMUNICATIONS SYSTEM

(71) Applicant: Panasonic Intellectual Property Management Co., Ltd., Osaka (JP)

(72) Inventors: Hikaru Maeda, Osaka (JP); Shinichiro Kurihara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/353,880

(22) Filed: Mar. 14, 2019

(65) Prior Publication Data

US 2019/0306957 A1 Oct. 3, 2019

(30) Foreign Application Priority Data

Mar. 28, 2018 (JP) ................................ 2018-062613

(51) Int. Cl.
*H05B 37/02* (2006.01)
*H05B 39/04* (2006.01)
*H05B 41/36* (2006.01)
*H05B 33/08* (2006.01)

(52) U.S. Cl.
CPC ....... *H05B 37/0272* (2013.01); *H05B 33/086* (2013.01)

(58) Field of Classification Search
None
See application file for complete search history.

(56) References Cited

U.S. PATENT DOCUMENTS

| 10,356,887 | B2* | 7/2019 | Maeda | H05B 37/0272 |
| 2005/0221752 | A1 | 10/2005 | Jamieson | |
| 2017/0279630 | A1* | 9/2017 | Anderson | G05B 19/042 |
| 2018/0213349 | A1* | 7/2018 | Panje | H04L 67/12 |
| 2018/0220513 | A1* | 8/2018 | Ackmann | H05B 37/0272 |

FOREIGN PATENT DOCUMENTS

JP 2005-528852 A 9/2005

* cited by examiner

*Primary Examiner* — Anh Q Tran
(74) *Attorney, Agent, or Firm* — Renner, Otto, Boisselle & Sklar, LLP (57) ABSTRACT

A communications device relays information between a start node among one or more first lighting devices included in a first local network and an end node among one or more second lighting devices included in a second local network different from the first local network. The communications device includes a first processing unit that wirelessly communicates with the one or more first lighting devices via a first communications protocol; a second processing unit that wirelessly communicates with the one or more second lighting devices via a second communications protocol different from the first communications protocol; and a control unit that switches between causing the first processing unit to wirelessly communicate with the one or more first lighting devices and causing the second processing unit to wirelessly communicate with the one or more second lighting devices.

10 Claims, 6 Drawing Sheets

COMMUNICATIONS DEVICE AND COMMUNICATIONS SYSTEM

CROSS REFERENCE TO RELATED APPLICATION

This application claims the benefit of priority of Japanese Patent Application Number 2018-062613 filed on Mar. 28, 2018 the entire content of which is hereby incorporated by reference.

BACKGROUND

1. Technical Field

The present disclosure relates to a communications device and a communications system.

2. Description of the Related Art

Method for appending a route to a message including a short routing indicator across a piconet including a master and slaves is disclosed by Japanese Unexamined Patent Application Publication (Translation of PCT Application) No. 2005-528852.

SUMMARY

When the communications protocols used by two local networks are mutually different, there is a desire to transmit information appropriately from one local network to the other.

In view of this, the present disclosure has an object to provide a communications device and a communications system capable of appropriately transmitting information between two different local networks.

In order to achieve the above object, a communications device according to one aspect of the present disclosure relays information between a start node among one or more first devices included in a first local network and an end node among one or more second devices included in a second local network different from the first local network. The communications device includes: a first processor configured to wirelessly communicate with the one or more first devices via a first communications protocol; a second processor configured to wirelessly communicate with the one or more second devices via a second communications protocol different from the first communications protocol; and a controller configured to switch between causing the first processor to wirelessly communicate with the one or more first devices and causing the second processor to wirelessly communicate with the one or more second devices.

Moreover, a communications system according to one aspect of the present disclosure includes a communications device, the one or more first devices, and the one or more second devices.

According to the present disclosure, it is possible to appropriately transmit information between two different local networks.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

The following describes an embodiment with reference to the drawings. The embodiment described below shows a preferred, specific example of the present disclosure. The numerical values, shapes, materials, elements, the arrangement and connection of the elements, steps, order of the steps, etc., indicated in the following embodiment are mere examples, and therefore do not intend to limit the present disclosure. Therefore, among elements in the following embodiment, those not recited in any of the broadest, independent claims are described as optional elements.

Note that the drawings are represented schematically and are not necessarily precise illustrations. Additionally, like reference signs indicate like elements in the drawings, and overlapping descriptions thereof are omitted or simplified.

Hereinafter, a communications device and communications system according to an embodiment of the present disclosure will be described.

Embodiment (Configuration)

Figure 1:
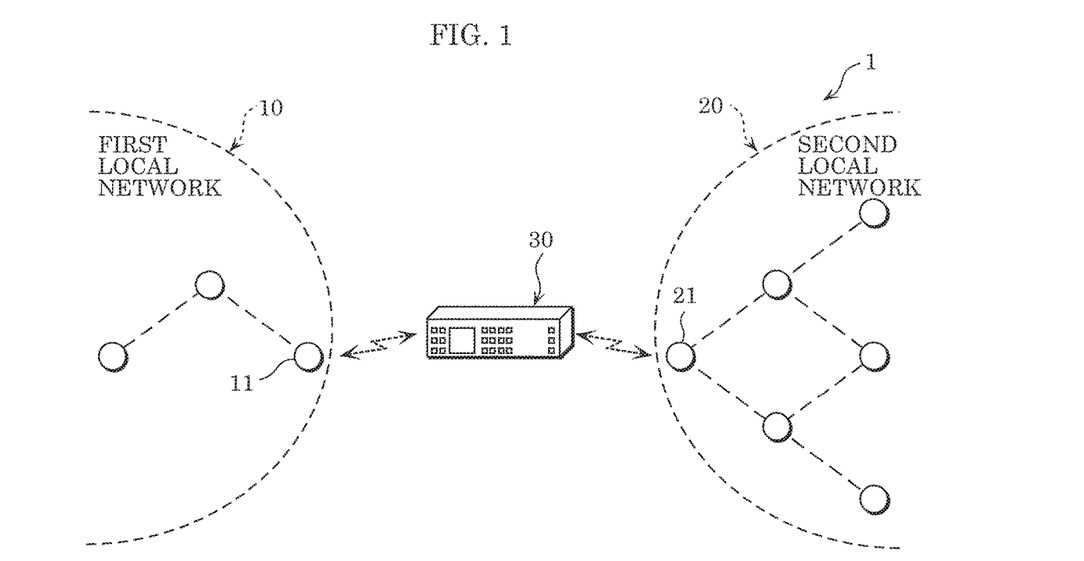
FIG. 1 schematically illustrates a lighting system according to an embodiment.

FIG. 1 schematically illustrates lighting system 1 according to this embodiment.

As illustrated in FIG. 1, lighting system 1 includes, for example, a plurality of lighting devices and communications device 30, each including a wireless communications function. In lighting system 1, a local network of a plurality of lighting devices is formed by adjacent lighting devices wirelessly communicating with each other and forming wireless communication paths. Here, a local network refers to a network of wireless communication paths between lighting devices. In lighting system 1, a given lighting device among a plurality of lighting devices included in one local network is designated as a start node, and a given lighting device among a plurality of lighting devices included in a different local network is designated as a end node, and a route is established across two different local networks, between the start node and the end node. Lighting system 1 is one example of the communications system.

Lighting system 1 includes first local network 10, second local network 20, and communications device 30. When the communications protocol used in first local network 10 and the communications protocol used in second local network 20 are different, sharing of information ("information" used hereinafter is an umbrella term that includes "first information" and "second information", which will be described later) such as a control command for the lighting devices between first local network 10 and second local network 20 is enabled in lighting system 1. Here, the control command indicates a lighting scene in which one or more combinations of dimming control and color control parameters, such as for controlling the hue or color temperature of light, are reproduced by lighting devices.

Note that in this embodiment, first local network 10 and second local network 20 are exemplified as being connected by wirelessly communicating via communications device 30. A first mesh network may be used as an example of first local network 10, and a different, second mesh network may be used as an example of second local network 20.

(First Local Network)

First local network 10 is a local network that includes one or more first lighting devices 11, and is different from second local network 20. A portion of the one or more first lighting devices 11 are connected to communications device 30 such that wireless connection is possible. Each first lighting device 11 is capable of communicating with a communications terminal capable of operating each first lighting device 11. In first local network 10, first lighting devices 11 wirelessly communicate with each other via a wireless communication method according to the first communications protocol. First lighting device 11 is one example of the first device. Note that the first device is not limited to a lighting device, and may be some other device such as an air conditioner, printer, or smartphone, etc.

Figure 2:
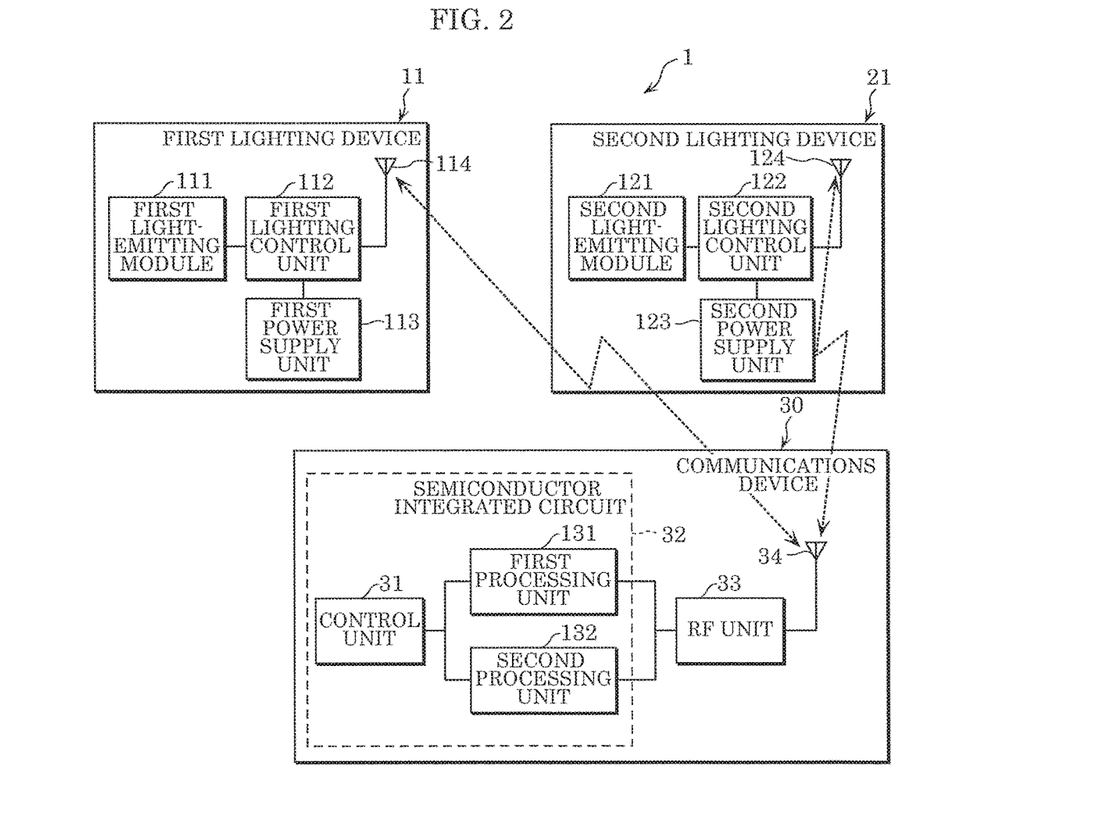
FIG. 2 is a block diagram of a lighting system according to an embodiment.

Each first lighting device 11 is, for example, a ceiling light or downlight, and is installed in a part of a building, such as a ceiling or a wall. As illustrated in FIG. 2, each first lighting device 11 includes first light-emitting module 111, first communications unit 114, first lighting control unit 112, and first power supply unit 113. FIG. 2 is a block diagram of lighting system 1 according to this embodiment.

The dimming and color of light emitted by first light-emitting module 111 is controlled by first lighting control unit 112. First light-emitting module 111 includes a substrate and a plurality of light-emitting elements mounted on the substrate.

The substrate is an approximately rectangular printed substrate for mounting the plurality of light-emitting elements. Examples of the substrate include a resin substrate including resin as a base material, a metal-based substrate including metal as a base material, and a ceramic substrate including a ceramic material.

The light-emitting elements are mounted on the substrate. Each light-emitting element includes a light-emitting diode (LED). In this embodiment, each light-emitting element is an RGB LED element that emits red, green, and blue light. The light-emitting elements are not limited to RGB elements that emit three colors of red, green, and blue light; the light-emitting elements may be RGBW elements that emit four colors of red, green, blue, and white light, and may be BW elements emit two colors of blue and white light.

First communications unit 114 includes an antenna and a wireless module. First communications unit 114 in a given first lighting device 11 is disposed in a location at which wireless communication with communications device 30 is possible. First communications unit 114 receives second information such as a second control command indicating, for example, a lighting scene set in second local network 20, and transmits first information such as a first control command indicating, for example, a lighting scene set in first local network 10.

Moreover, first communications unit 114 in a given first lighting device 11 wirelessly communicates with first communications unit 114 included in a different first lighting device 11. This enables each first lighting device 11 to communicate with another proximally located first lighting device 11. The wireless communication method is, for example, WiFi (registered trademark), Bluetooth (registered trademark), or ZigBee (registered trademark) stipulated in IEEE 802.15.1. In this embodiment, wireless communication is performed using the 2.4 GHz frequency band.

In this embodiment, first local network 10 is a ZigBee network that employs mesh routing. ZigBee employs mesh routing to establish an optimal route within the network. Such a first local network 10 is a network that creates route information (establishes routes). Even if first local network 10 is located between the start node and the end node, a route between the start node and the end node can be established.

First lighting control unit 112 is electrically connected to first light-emitting module 111, first communications unit 114, and first power supply unit 113. For example, first lighting control unit 112 can control the dimming and color of light emitted by first light-emitting module 111 by controlling the dimming circuit and color adjustment circuit in first light-emitting module 111.

First lighting control unit 112 can be implemented using, for example, a microcomputer including a central processing unit (CPU). First lighting control unit 112 can perform predetermined lighting control operations by, for example, executing an appropriate program stored in a memory unit. The memory unit can be implemented using non-volatile semiconductor memory such as flash memory or electrically erasable and programmable read only memory (EEPROM).

First power supply unit 113 converts alternating current power supplied from a utility power supply into direct current power of a predetermined level by, for example, rectifying, smoothing, and stepping down the alternating current power, and supplies the converted direct current power to first light-emitting module 111 via first lighting control unit 112.

(Second Local Network)

Second local network 20 is a local network that includes one or more second lighting devices 21. A portion of the one or more second lighting devices 21 are wirelessly communicably connected to communications device 30. Each second lighting device 21 is capable of communicating with a communications terminal capable of operating each second lighting device 21. In second local network 20, second lighting devices 21 wirelessly communicate with each other via a wireless communication method according to a second communications protocol different from the first communications protocol. Second lighting device 21 is one example of the second device. Note that the second device is not limited to a lighting device, and may be some other device such as an air conditioner, printer, or smartphone, etc.

Each second lighting device 21 is, for example, a ceiling light or downlight, and is installed in a part of a building, such as a ceiling or a wall. Each second lighting device 21 includes second light-emitting module 121, second communications unit 124, second lighting control unit 122, and second power supply unit 123.

The dimming and color of light emitted by second light-emitting module 121 is controlled by second lighting control unit 122. Second light-emitting module 121 includes a substrate and a plurality of light-emitting elements mounted on the substrate.

The substrate is an approximately rectangular printed substrate for mounting the plurality of light-emitting elements. Examples of the substrate include a resin substrate including resin as a base material, a metal-based substrate including metal as a base material, and a ceramic substrate including a ceramic material.

The light-emitting elements are mounted on the substrate. Each light-emitting element includes a light-emitting diode (LED). In this embodiment, each light-emitting element is an RGB LED element that emits red, green, and blue light. The light-emitting elements are not limited to RGB elements that emit three colors of red, green, and blue light; the light-emitting elements may be RGBW elements that emit four colors of red, green, blue, and white light, and may be BW elements emit two colors of blue and white light.

Second communications unit 124 includes an antenna and a wireless module. Second communications unit 124 in a given second lighting device 21 is disposed in a location at which wireless communication with communications device 30 is possible. Second communications unit 124 receives first information such as a first control command indicating, for example, a lighting scene set in first local network 10, and transmits second information such as a second control command indicating, for example, a lighting scene set in second local network 20.

Moreover, second communications unit 124 in a given second lighting device 21 wirelessly communicates with second communications unit 124 included in a different second lighting device 21. This enables each second lighting device 21 to communicate with another proximally located second lighting device 21.

The wireless communication method is, for example, WiFi stipulated in IEEE 802.11, or Bluetooth (registered trademark) or ZigBee stipulated in IEEE 802.15.1. In this embodiment, wireless communication is performed using the 2.4 GHz frequency band.

In this embodiment, second local network 20 is a Bluetooth mesh network that employs managed flooding, which is for optimizing data to be forwarded to all nodes connected to second local network 20. For example, when a device broadcasts a message (packet), a device that receives the broadcast relays the broadcast to surrounding devices so that the message reaches all devices capable of communication. However, if unregulated, the message will flood the network. Accordingly, control is implemented that, for example, prevents a message that has been transmitted from being retransmitted or limits the number of times the message can be relayed. Such a second local network 20 is a network that does not create route information (does not establish routes). Even if second local network 20 is located between the start node and the end node, a route between the start node and the end node cannot be established.

Second lighting control unit 122 is electrically connected to second light-emitting module 121, second communications unit 124, and second power supply unit 123. For example, second lighting control unit 122 can control the dimming and color of light emitted by second light-emitting module 121 by controlling the dimming circuit and color adjustment circuit in second light-emitting module 121.

Second lighting control unit 122 can be implemented using, for example, a microcomputer including a CPU. Second lighting control unit 122 can perform predetermined lighting control operations by, for example, executing an appropriate program stored in a memory unit.

Second power supply unit 123 converts alternating current power supplied from a utility power supply into direct current power of a predetermined level by, for example, rectifying, smoothing, and stepping down the alternating current power, and supplies the converted direct current power to second light-emitting module 121 via second lighting control unit 122.

(Communications Device)

Communications device 30 is a gateway device that wirelessly connects one or more first lighting devices 11 included in first local network 10 with one or more second lighting devices 21 included in second local network 20, which is different from first local network 10. Note that communications device 30 may be a lighting device including such a gateway device.

Communications device 30 can reciprocally wirelessly communicate with first local network 10 that wirelessly communicates via the first communications protocol, and can reciprocally wirelessly communicate with second local network 20 that wirelessly communicates via the second communications protocol different from the first communications protocol. In other words, communications device 30 is capable of multiprotocol wireless communication. Note that in this embodiment, communications device 30 performs wireless communication using a single control unit 32.

Communications device 30 establishes a route between a first lighting device 11 functioning as a start node among one or more first lighting devices 11 included in first local network 10 and one second lighting device 21 functioning as an end node among one or more second lighting devices 21 included in second local network 20.

Here, a start node refers to a node that is the point of departure of information to be transmitted to the end node, and is also referred to as a source. An end node refers to a node that is the point of arrival of information output by the start node, and is also referred to as a destination.

Communications device 30 includes a single semiconductor integrated circuit 32, third communications unit 34, and radio frequency (RF) unit 33.

The single semiconductor integrated circuit 32 is a single IC chip. Semiconductor integrated circuit 32 is configured of, for example, a microprocessor, ROM, and RAM. Semiconductor integrated circuit 32 includes control unit 31 (one example of the controller), first processing unit 131 (one example of the first processor), and second processing unit 132 (one example of the second processor).

Control unit 31 is a host controller that controls processes performed by, for example, first processing unit 131 and second processing unit 132 included in communications device 30. Control unit 31 includes the top five layers of the open systems interconnection (OSI) reference model. First processing unit 131 and second processing unit 132 are included in the bottom physical layer of the OSI reference model.

First processing unit 131 is connected between control unit 31 and RF unit 33. First processing unit 131 wirelessly communicates with one or more first lighting devices 11 included in first local network 10 via the first communications protocol. First processing unit 131 uses a communications protocol that does not include an IP stack. Examples of communications protocols that do not include an IP stack include ZigBee and Bluetooth. An IP stack is a stack of IP layers capable of analyzing IP. In this embodiment, first processing unit 131 is a ZigBee chip for performing wireless communication via the first communications protocol, i.e., ZigBee.

First processing unit 131 receives the first control command from first lighting device 11 and transmits the second control command to first lighting device 11 by wirelessly communicating with first lighting device 11 via RF unit 33 and third communications unit 34, using the first communications protocol.

Second processing unit 132 is connected in parallel with first processing unit 131 between control unit 31 and RF unit 33. Second processing unit 132 wirelessly communicates with one or more second lighting devices 21 included in second local network 20 via the second communications protocol. In other words, second processing unit 132 uses a communications protocol that is different from the communications protocol used by first processing unit 131. Second processing unit 132 uses a communications protocol that does not include an IP stack. In this embodiment, second processing unit 132 is a Bluetooth chip for performing wireless communication via the second communications protocol, i.e., Bluetooth.

Second processing unit 132 receives the second control command from one or more second lighting devices 21 and transmits the first control command to one or more second lighting devices 21 by wirelessly communicating with one or more second lighting devices 21 via RF unit 33 and third communications unit 34, using the second communications protocol.

Accordingly, control unit 31 switches between causing first processing unit 131 to wirelessly communicate with one or more first lighting devices 11 and causing second processing unit 132 to wirelessly communicate with one or more second lighting devices 21. When first processing unit 131 receives a first control command from one or more first lighting devices 11, control unit 31 causes second processing unit 132 to transmit the first control command to one or more second lighting devices 21 via the second communications protocol. When second processing unit 132 receives a second control command from one or more second lighting devices 21, control unit 31 causes first processing unit 131 to transmit the second control command to one or more first lighting devices 11 via the first communications protocol.

Control unit 31 relays, to second local network 20, information including a time to live (TTL) hop count value and a TTL default value obtained from first local network 10. Control unit 31 also relays, to the start node, information including a hop count value that has been obtained from first local network 10 and has been reset to the default value at the end node.

This will be described in further detail with reference to FIG. 3A and FIG. 3B.

Figure 3A:
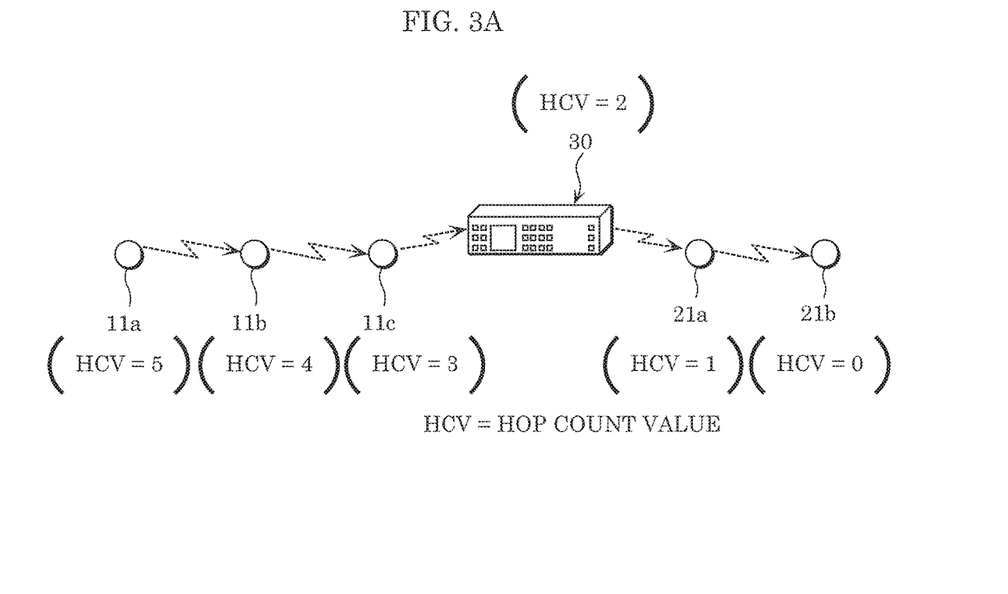
FIG. 3A schematically illustrates the hop count value in each node when first information is relayed from a first lighting device toward a second lighting device.

FIG. 3A schematically illustrates the hop count value in each lighting device when first information is relayed from first lighting device 11a toward second lighting device 21b. FIG. 3B schematically illustrates the hop count value in each node when second information is relayed from second lighting device 21b toward first lighting device 11a.

Figure 3B:
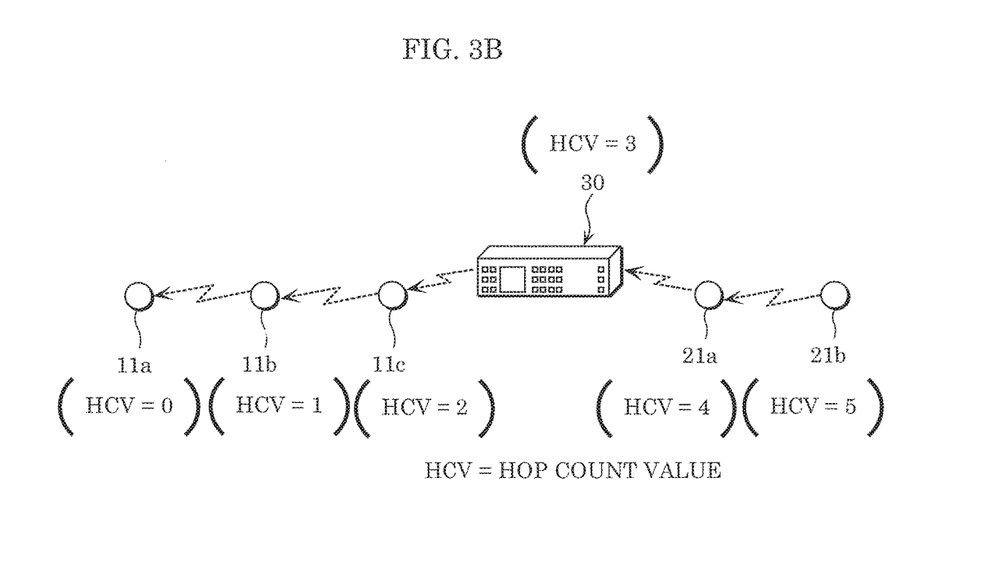
FIG. 3B schematically illustrates the hop count value in each node when second information is relayed from a second lighting device toward a first lighting device.

In the examples illustrated in FIG. 3A and FIG. 3B, first local network 10 is exemplified as including three first lighting devices 11, namely first lighting device 11a, 11b, and 11c, and second local network 20 is exemplified as including two second lighting devices 21, namely second lighting device 21a and 21b. Note that the number of first lighting devices 11 and the number of second lighting devices 21 used are not limited to these examples. Here, the start node is first lighting device 11a in first local network 10, and the end node is second lighting device 21b in second local network 20. First information for establishing a route from the start node (first lighting device 11a) to the end node (second lighting device 21b) is output from first lighting device 11a. The trigger for first lighting device 11a to output this information is, for example, a request from communications device 30 or a request from a control terminal not illustrated in the drawings.

Here, this information includes, for example, a source address indicating the start node, a registry ID, a destination address indicating the end node, a sequence number, a TTL, and a payload. The TTL includes the default value and the hop count value.

First, the settings are initialized in lighting system 1. In the initialization of the settings, for example, when the first information is to be relayed from first lighting device 11a to second lighting device 21a, processing for verifying how many hops it takes to relay the first information is performed. With 1 hop, the first information can only reach first lighting device 11b adjacent to first lighting device 11a. The hop count is therefore incremented by one, and processing for verifying whether the first information can reach the end node with two hops is performed. In this way, the hop count value is incremented one by one to verify how many hops it takes to reach the end node. As illustrated in FIG. 3A, in this embodiment, five hops are required to reach second lighting device 21a from first lighting device 11a.

In this case, in first local network 10, after the hop from first lighting device 11a to first lighting device 11b, the TTL default value remains five and, one is subtracted from the current hop count value of five, whereby the TTL hop count value becomes four. Next, after the hop from first lighting device 11b to first lighting device 11c, the TTL default value remains five, and one is subtracted from the current hop count value of four, whereby the TTL hop count value becomes three. Next, after the hop from first lighting device 11c to communications device 30, the TTL default value remains five, and one is subtracted from the current hop count value of three, whereby the TTL hop count value becomes two. Moreover, the order of the hops from first lighting device 11a to 11b to 11c and then to communications device 30, that is to say, the route taken, is written into the first information each time the first information is relayed from node to node. Here, the route via which the first information is relayed, i.e., the route from first lighting device 11a to 11b to 11c and then to communications device 30, is written into the first information. Nodes include first lighting devices 11a, 11b, 11c, communications device 30, and second lighting devices 21a and 21b.

The source address, destination address, sequence number, TTL, etc., in the second information for second local network 20 is kept the same as the source address, destination address, sequence number, TTL, etc., in the first information for first local network 10 when it is relayed by communications device 30. In other words, control unit 31 in communications device 30 relays the first information received from first local network 10 to second local network 20.

Next, in second local network 20, after the hop from communications device 30 to second lighting device 21a, the TTL default value remains five, and one is subtracted from the current hop count value of two, whereby the TTL hop count value becomes one. Here, control unit 31 in communications device 30 stores, in a storage unit included in communications device 30 (not illustrated), information indicating that the TTL default value and TTL hop count value at second lighting device 21a are five and one, respectively. Next, after the hop from second lighting device 21a to second lighting device 21b, the TTL default value remains five, and one is subtracted from the current hop count value of one, whereby the TTL hop count value becomes zero. Moreover, at second lighting device 21a and 21b as well, the order of the hops between second lighting devices, that is to say, the route taken in regard to second lighting devices, is written into the first information each time the first information is relayed from node to node. Here, a route from first lighting device 11a to 11b to 11c to communications device 30 to second lighting device 21a and then to 21b is written into the first information.

When a hop is made from second lighting device 21a to second lighting device 21b, the destination address included in the first information is second lighting device 21b, which is a match. As illustrated in FIG. 3B, second lighting device 21b resets the TTL hop count value of zero in the first information with the TTL default value of five thereby updating the TTL hop count value to five. Then second lighting device 21b responds to first lighting device 11a, which is the start node, with updated second information. Here, "responds" means, for example, send an acknowledgement (ACK).

Similarly, in this case as well, in second local network 20, after the hop from second lighting device 21b to second lighting device 21a, the TTL default value remains five, and one is subtracted from the current hop count value of five, whereby the TTL hop count value becomes four. Next, after the hop from second lighting device 21b to communications device 30, the TTL default value remains five, and one is subtracted from the current hop count value of four, whereby the TTL hop count value becomes three.

In first local network 10, after the hop from communications device 30 to first lighting device 11c, the TTL default value remains five, and one is subtracted from the current hop count value of three, whereby the TTL hop count value becomes two. Next, after the hop from first lighting device 11c to first lighting device 11b, the TTL default value remains five, and one is subtracted from the current hop count value of two, whereby the TTL hop count value becomes one. Next, after the hop from first lighting device 11b to first lighting device 11a, the TTL default value remains five, and one is subtracted from the current hop count value of one, whereby the TTL hop count value becomes zero. In this way, in lighting system 1, a route is established from first lighting device 11a to first lighting device 11b to first lighting device 11c to communications device 30 to second lighting device 21a and then to second lighting device 21b.

If a TTL hop count value is not used, communications device 30 transmits information via broadcast, which means that even if second lighting device 21a is present between communications device 30 and second lighting device 21b (the end node), communications device 30 cannot count second lighting device 21a and thus a route from the start node to the end node cannot be established.

Next, we will return to the description of control unit 31. In this embodiment, when communication is performed between first lighting device 11 and communications device 30 via ZigBee, control unit 31 obtains the first control command obtained by first processing unit 131 from the one or more first lighting devices 11. Control unit 31 outputs the first control command obtained via ZigBee by first processing unit 131 to second processing unit 132. Second processing unit 132 transmits the obtained first control command to one or more second lighting devices 21 via Bluetooth.

Moreover, control unit 31 performs wireless communication using first processing unit 131 and performs wireless communication using second processing unit 132 temporally mutually exclusively. More specifically, first processing unit 131 and second processing unit 132 intermittently receive control commands in fixed reception intervals and reception windows (see FIG. 5 to be described later). In this embodiment, the reception window in which first processing unit 131 can receive the first control command is referred to as a scan window, and the reception interval between scan windows is referred to as a scan interval. The same applies to second processing unit 132. In this embodiment, the scan window of first processing unit 131 and the scan window of second processing unit 132 are temporally mutually exclusive. Naturally, since communications device 30 intermittently transmits control commands per scan interval, unless the scan window overlaps with the timing of the transmission of control command of first lighting device 11 or second lighting device 20, communications device 30 cannot receive control commands. Accordingly, in this embodiment, ZigBee communication between one or more first lighting devices 11 and communications device 30 and Bluetooth communication between one or more second lighting devices 21 and communications device 30 are temporally mutually exclusive and performed alternately. Note that where the terminology "control command" is used herein, it is used to collectively refer to both the first and second control commands.

Third communications unit 34 is connected to RF unit 33. Third communications unit 34 is a wireless communications antenna that transmits and receives control commands to and from one or more first lighting devices 11 and one or more second lighting devices 21.

Upon receipt of a control command from first processing unit 131 or second processing unit 132, RF unit 33, for example, filters and amplifies the control command, and outputs it to third communications unit 34. RF unit 33 filters the first control command received from the one or more first lighting devices 11 via third communications unit 34, outputs the result to first processing unit 131, filters the second control command received from the one or more second lighting devices 21 via third communications unit 34, and outputs the result to second processing unit 132.

RF unit 33 includes a transmission circuit and a reception circuit. The transmission circuit includes, for example, for control commands it is to transmit, a transmission filter that extracts a transmission band signal indicated in the control command, a transmission mixer that up-converts a signal output from the transmission filter into a high frequency signal, and a preamplifier that amplifies the up-converted high frequency signal. The reception circuit includes, for example, a reception mixer that converts a high frequency signal received by third communications unit 34 from the one or more first lighting devices 11 and the one or more second lighting devices 21, into a low frequency signal.

Note that communications device 30 is merely one example and may be installed in a lighting device or installed in a device such as a speaker, air conditioner, printer, or smartphone, etc.

(Operations)

Next, operations performed by lighting system 1 will be described.

Figure 4A:
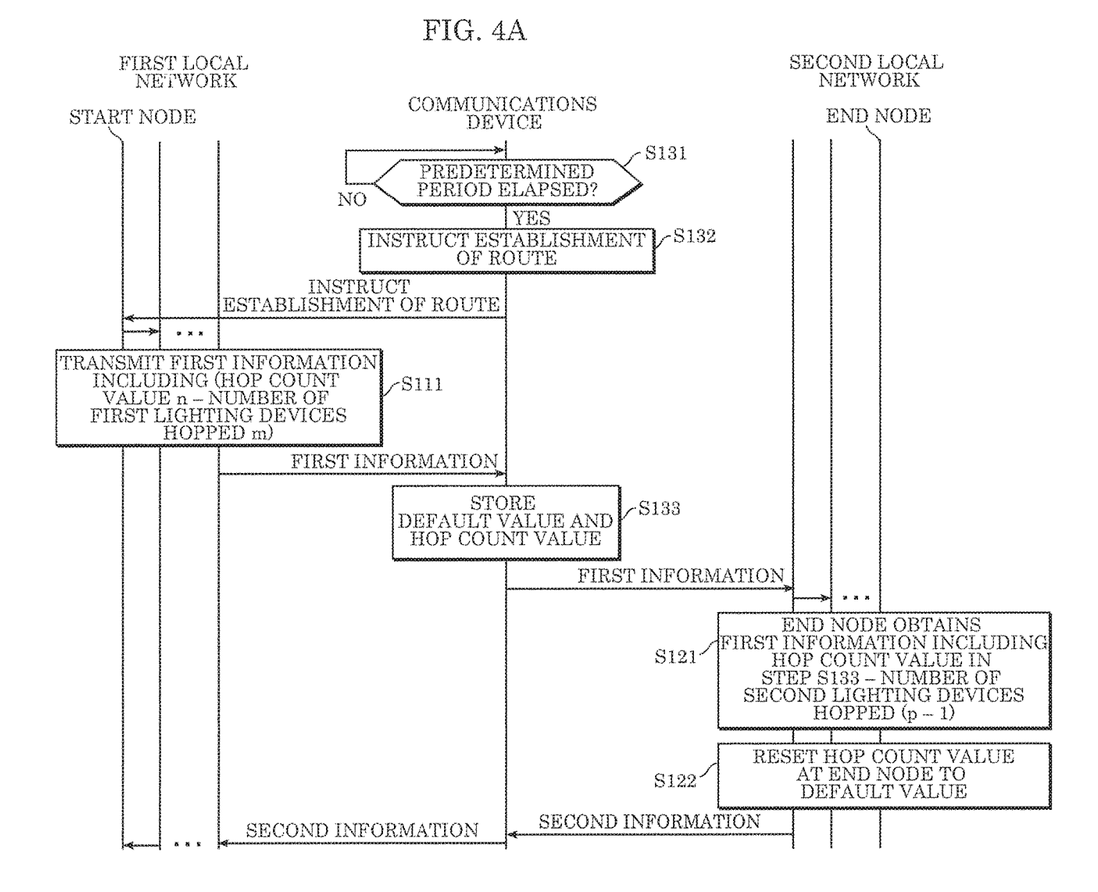
FIG. 4A is a sequence chart illustrating operations performed by a lighting system according to an embodiment when establishing a route.

FIG. 4A is a sequence chart illustrating operations performed by lighting system 1 according to this embodiment when establishing a route.

Here, one of m first lighting devices (n1, n2 ... nm) included in first local network 10 is set as the start node and one of p second lighting devices (k1, k2 ... kp) included in second local network 20 is set as the end node. Here, first lighting device n1 is the start node, and the device closest to communications device 30 (the device that directly wirelessly communicates with communications device 30) is first lighting device nm. Second lighting device kp is the end node, and the device closest to communications device 30 (the device that directly wirelessly communicates with communications device 30) is second lighting device k1.

As illustrated in FIG. 4A, communications device 30 determines whether a predetermined period has elapsed or not since a route was established, the power was switched from off to on, or the power was switched from on to off (S131). When the predetermined period has not elapsed since a route was established (NO in S131), communications device 30 waits until the predetermined period has elapsed.

When the predetermined period has elapsed since a route was established, the power was switched from off to on, or the power was switched from on to off (YES in S131), communications device 30 outputs an instruction to the start node in first local network 10 instructing the start node to establish a route (S132). Note that before step S132, communications device 30 may first check whether a route from the start node to the end node is established, and then output the instruction to the start node instructing the start node to establish a route. If a route is not already established, a route from the start node to the end node is established.

Next, the start node verifies how many hops it takes to reach the end node. For example, the start node calculates the minimum hop count from the start node to the end node. In this embodiment, the minimum hop count is m.

First, the hop count n is set to 1 (hop count value n=1), and an attempt is made to relay first information from the start node to the end node. If a response is not received from the end node within a certain period of time, it is determined that the end node has not received the first information. If the first information does not reach the end node, the hop count n is incremented by one (hop count value n=2), and an attempt is made to relay the first information from the start node to the end node. The same is repeated p times until the first information reaches the end node from the start node. Specifics regarding the operations performed will be described later.

When the first information can reach the end node from the start node on the p-th attempt, in other words, when a response is received from the end node within the certain period of time, the start node relays the first information including the TTL hop count value and TTL default value n to the end node. In other words, the first information hops across m first lighting devices in first local network 10 and reaches communications device 30, at which point the first information includes hop count value (n−m) obtained by subtracting this hop count of m from hop count value n (S111).

Next, communications device 30 receives the first information including the hop count value (n−m) from first lighting device nm included in first local network 10. Communications device 30 stores, for example, the TTL hop count value and TTL default value (S133). Here, the hop count value is (n−m). In this embodiment, the hop count value (n−m) is stored, but a hop count value of (n−m−1) for the next recipient second lighting device k1 included in second local network 20 may be stored. Communications device 30 transmits the first information to second lighting device k1 included in second local network 20. In other words, communications device 30 relays the first information including the TTL hop count value and TTL default value obtained from first local network 10 to second local network 20.

In second local network 20, the first information hops across (p−1) second lighting devices including second lighting device k1 before reaching the end node, second lighting device kp (S121). The hop count value at the end node is (n−m−p+1). (n−m−p+1) is a value greater than or equal to 0.

Next, at the end node, hop count value (n−m−p+1) included in the obtained first information is reset to the default value n (S122). In other words, both the default value and the hop count value become n. Next, the end node transmits second information back to the start node. In other words, second lighting device kp, which was the end node, becomes the start node, and first lighting device n1, which was the start node, becomes the end node. Then, second lighting device kp, which is now the start node, relays the second information to first lighting device n1, which is now the end node. In other words, the second information including a new hop count value obtained by resetting the hop count value at the end node to the default value is relayed to the former start node.

The above applies to this case as well. In this way, in lighting system 1, a route is established from first lighting device n1 to first lighting device n2 ... first lighting device nm to communications device 30 to second lighting device k1 to second lighting device k2 ... second lighting device kp.

Figure 4B:
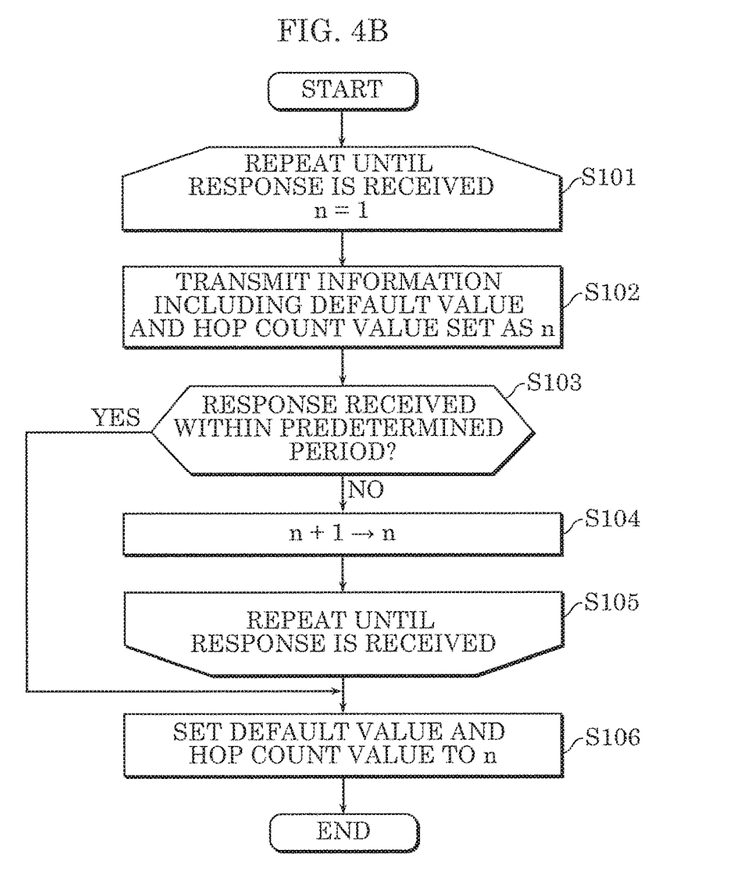
FIG. 4B is a flow chart illustrating operations for determining a hop count value in a lighting system according to an embodiment.

FIG. 4B is a flow chart illustrating operations for determining a hop count value in a lighting system according to the embodiment. FIG. 4B describes operations performed by the start node included in first local network 10 to calculate the TTL default value and the TTL hop count value, as instructed by the route establishment in step S132 in FIG. 4A.

As illustrated in FIG. 4B, first lighting device n1, which is the start node, repeatedly transmits information to second lighting device kp, which is the end node, until first lighting device n1 receives a response from second lighting device kp (S101 through S105).

More specifically, first lighting device n1 sets the hop count value to n=1, and attempts to transmit the first information to second lighting device kp (S102).

Next, first lighting device n1 determines whether there was a response from second lighting device kp within a predetermined period regarding the first information transmitted in step S102 (S103).

When there is no response within the predetermined period (NO in S103), first lighting device n1 adds a value of one to hop count value n=1 to change the hop count value to n=2 (S104). In this way, until the start node receives a response from the end node, the hop count value is incremented and the first information is repeatedly transmitted p times (steps S101 through S105). Here, "p times" means the number of hops required from the start node to the end node.

When there is a response within in the predetermined period (YES in S103), the TTL default value and TTL hop count value are set to the value of n at that time. This completes the flow of processes.

Next, operations performed by lighting system 1 after a route is established will be described.

Figure 5:
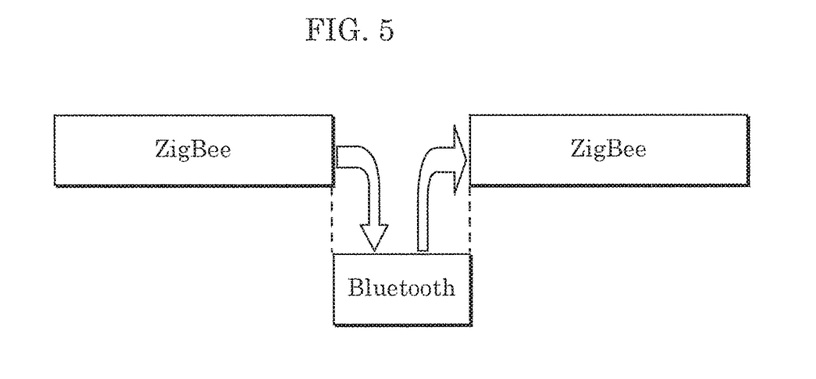
FIG. 5 illustrates operations performed by a communications device in a lighting system according to an embodiment.
Figure 6:
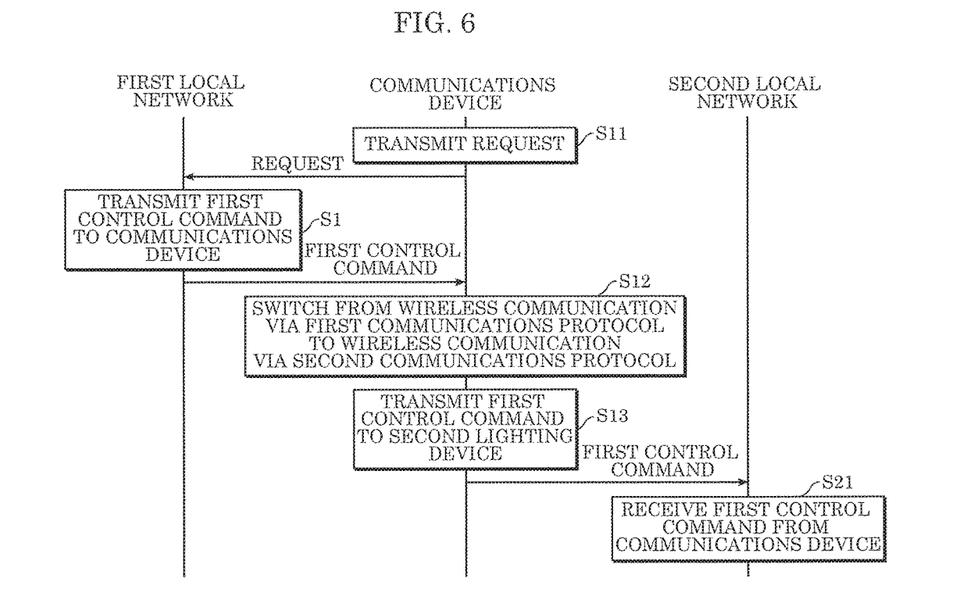
FIG. 6 is a sequence chart illustrating operations performed by a lighting system according to an embodiment.

FIG. 5 illustrates operations performed by communications device 30 in lighting system 1 according to the embodiment. FIG. 6 is a sequence chart illustrating operations performed by lighting system 1 according to the embodiment.

Here, an example will be given in which a first control command, which is one example of the first information, is transmitted from one or more first lighting devices 11 included in first local network 10 to one or more second lighting devices 21 included in second local network 20 as a result of a user operating a control terminal.

First, communications device 30 transmits a request to one or more first lighting devices 11 included in first local network 10 to obtain the first control command indicating a lighting scene set by the user and to be reproduced by one or more first lighting devices 11 (S11). More specifically, control unit 31 transmits a request to one or more first lighting devices 11 via third communications unit 34.

Next, as illustrated in FIG. 5 and FIG. 6, when one or more first lighting devices 11 receive, via first communications unit 114, the request transmitted by communications device 30, the one or more first lighting devices 11 transmit the first control command to communications device 30 (Si).

Next, communications device 30 receives the first control command. Control unit 31 in communications device 30 switches from performing wireless communication via the first communications protocol to performing wireless communication via the second communications protocol (S12). In other words, control unit 31 causes second processing unit 132 to transmit, via Bluetooth, to one or more second lighting devices 21 included in second local network 20, the first control command obtained by first processing unit 131 via ZigBee communication between one or more first lighting devices 11 and communications device 30. Note that here, when communications device 30 is installed in a lighting device, the lighting device may store the received first control command into a storage unit such as memory, and may emit light according to the lighting scene indicated in the first control command.

Next, control unit 31 causes second processing unit 132 to transmit, via the second communications protocol, the first control command received from one or more first lighting devices 11 via third communications unit 34, to one or more second lighting devices 21 included in second local network 20 (S13). In other words, second processing unit 132 transmits, via third communications unit 34, the first control command to one or more second lighting devices 21 using the second communications protocol.

Next, one or more second lighting devices 21 receive the first control command from communications device 30 via second communications unit 124 (S21). This completes the processing.

Figure 7:
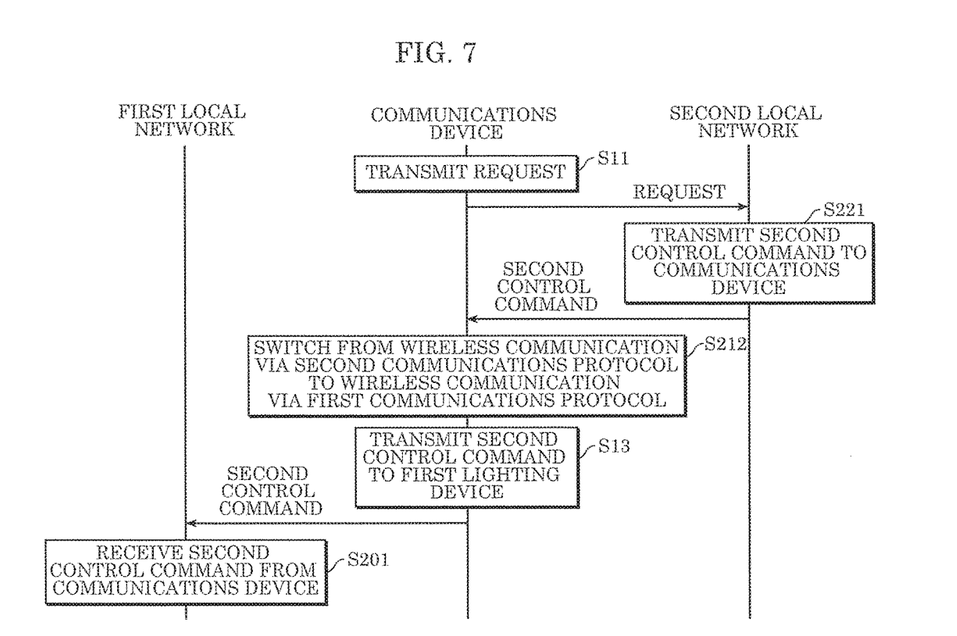
FIG. 7 is a sequence chart illustrating operations performed by a lighting system according to an embodiment.

Next, an example will be given in which a second control command is transmitted to one or more first lighting devices 11 included in first local network 10 from one or more second lighting devices 21 included in second local network 20.

FIG. 7 is a sequence chart illustrating operations performed by lighting system 1 according to the embodiment.

First, as illustrated in FIG. 7, communications device 30 transmits a request to one or more second lighting devices 21 included in second local network 20 to obtain the second control command indicating a lighting scene set by the user and to be reproduced by one or more second lighting devices 21 (S11). The second control command is one example of the second information.

Next, when one or more second lighting devices 21 receive, via second communications unit 124, the request transmitted by communications device 30, the one or more second lighting devices 21 transmit the second control command to communications device 30 (S221).

Next, communications device 30 receives the second control command. Control unit 31 in communications device 30 switches from performing wireless communication via the second communications protocol to performing wireless communication via the first communications protocol (S212). In other words, control unit 31 causes first processing unit 131 to transmit, via ZigBee, to one or more first lighting devices 11 included in first local network 10, the second control command obtained by second processing unit 132 via Bluetooth between one or more second lighting devices 21 and communications device 30. Note that here, when communications device 30 is installed in a lighting device, the lighting device may store the received second control command into a storage unit such as memory, and emit light according to the lighting scene indicated in the second control command.

Next, control unit 31 causes first processing unit 131 to transmit, via the first communications protocol, the second control command received from one or more second lighting devices 21 via third communications unit 34, to one or more first lighting devices 11 included in first local network 10 (S13). In other words, first processing unit 131 transmits, via third communications unit 34, the second control command to one or more first lighting devices 11 using the first communications protocol.

Next, one or more first lighting devices 11 receive the second control command from communications device 30 via first communications unit 114 (S201). This completes the processing.

With this, as illustrated in FIG. 6 and FIG. 7, in lighting system 1, first local network 10 and second local network 20, which are mutually different, can wirelessly communicate.

(Operational Advantages)

Next, the operational advantages of lighting system 1 and communications device 30 according to this embodiment will be described.

As described above, communications device 30 according to this embodiment relays information between a start node among one or more first lighting devices 11 included in first local network 10 and an end node among one or more second lighting devices 21 included in second local network 20 different from first local network 10. Communications device 30 includes: first processing unit 131 that wirelessly communicates with the one or more first lighting devices 11 via a first communications protocol; second processing unit 132 configured to wirelessly communicate with one or more second lighting devices 21 via a second communications protocol different from first communications protocol; and control unit 31 that switches between causing first processing unit 131 to wirelessly communicate with one or more first lighting devices 11 and causing second processing unit 132 to wirelessly communicate with one or more second lighting devices 21.

For example, when first local network 10 communicates via ZigBee and second local network 20 communicates via Bluetooth, communications device 30 can recognize a route of hops across first lighting devices via ZigBee, but since Bluetooth uses a broadcast communications system, only the end node can be recognized, and it is unknown how many second lighting devices 21 are present between communications device 30 and the end node. In this situation, it is not possible to relay information between the start node and the end node.

However, with the present embodiment, information is relayed between a start node among one or more first lighting devices 11 included in first local network 10 and an end node among one or more second lighting devices 21 included in second local network 20 different from first local network 10.

Accordingly, with this communications device 30, it is possible to appropriately relay information between two different local networks.

In particular, when a route is established between the start node and the end node, in lighting system 1, since information can be relayed using as few network devices as possible, network load can be minimized and communication can be securely performed between the start node and the end node.

Moreover, lighting system 1 according to this embodiment includes communications device 30, one or more first lighting devices 11, and one or more second lighting devices 21.

The same operational advantages as described above are also achievable with this configuration.

Moreover, in communications device 30 according to this embodiment, control unit 31 is further configured to: relay, to second local network 20, first information including a time to live (TTL) hop count value and a TTL default value obtained from first local network 10; and relay, to the start node, second information including a TTL hop count value obtained from second local network 20, the TTL hop count value being reset to the TTL default value at the end node.

With this, control unit 31 relays, to second local network 20, the first information including the TTL hop count value and TTL default value obtained from first local network 10. In other words, The TTL hop count value and the TTL default value are relayed even between different networks.

Moreover, control unit 31 relays, to the start node, the second information including a new hop count value obtained by resetting the hop count value at the end node to the default value. Upon receiving this second information, the start node can recognize a route from the start node to the end node, making it possible to establish a route from the start node to the end node. Accordingly, it is possible to appropriately relay information (the first and second information) between two different local networks.

Moreover, in communications device 30 according to this embodiment, control unit 31 is configured to establish a route between the start node and the end node when power in communications device 30 is switched from off to on or from on to off.

With this, control unit 31 establishes a route between start node and end node when the power in communications device 30 is switched from off to on or from on to off. This makes it possible to establish a new route from the start node to the end node even when the route has to be changed due to, for example, a change in the location of a node. This stabilizes communication between the start node and the end node.

Moreover, in communications device 30 according to this embodiment, control unit 31 is configured to determine whether an established route between the start node and the end node is intact at a predetermined interval, and when the established route is not intact, is configured to reestablish a route between the start node and the end node.

With this, control unit 31 determines whether an established route between the start node and the end node is intact at a predetermined interval, and when the established route between the start node and the end node is not intact, reestablishes a route so that information can be appropriately relayed between the two different local networks.

Moreover, in communications device 30 according to this embodiment, first local network 10 is a network in which a route from the start node to communications device 30 is currently established, and second local network 20 is a network in which a route from communications device 30 to the end node is not currently established.

With this, information can be appropriately relayed between two different local networks, namely first local network 10 that is capable of creating route information and second local network 20 that is not capable of creating route information.

Moreover, in communications device 30 according to this embodiment, the first communications protocol is ZigBee, and the second communications protocol is Bluetooth.

Moreover, in communications device 30 according to this embodiment, control unit 31 is configured to perform wireless communication using first processing unit 131 and perform wireless communication using second processing unit 132 temporally mutually exclusively.

Moreover, communications device 30 according to this embodiment relays information between a start node among one or more first lighting devices 11 included in first mesh network 10 and an end node among one or more second lighting devices 21 included in second mesh network 20 different from first mesh network 10. Communications device 30 includes: first processing unit 131 that wirelessly communicates with the one or more first lighting devices 11 via a first communications protocol; second processing unit 132 configured to wirelessly communicate with one or more second lighting devices 21 via a second communications protocol different from first communications protocol; and control unit 31 that switches between causing first processing unit 131 to wirelessly communicate with one or more first lighting devices 11 and causing second processing unit 132 to wirelessly communicate with one or more second lighting devices 21

Moreover, lighting system 1 according to this embodiment includes a lighting device including communications device 30 and a light-emitting module that emits light, one or more first devices each of which is first lighting device 11, and one or more second devices each of which is second lighting device 21.

Figure 8:
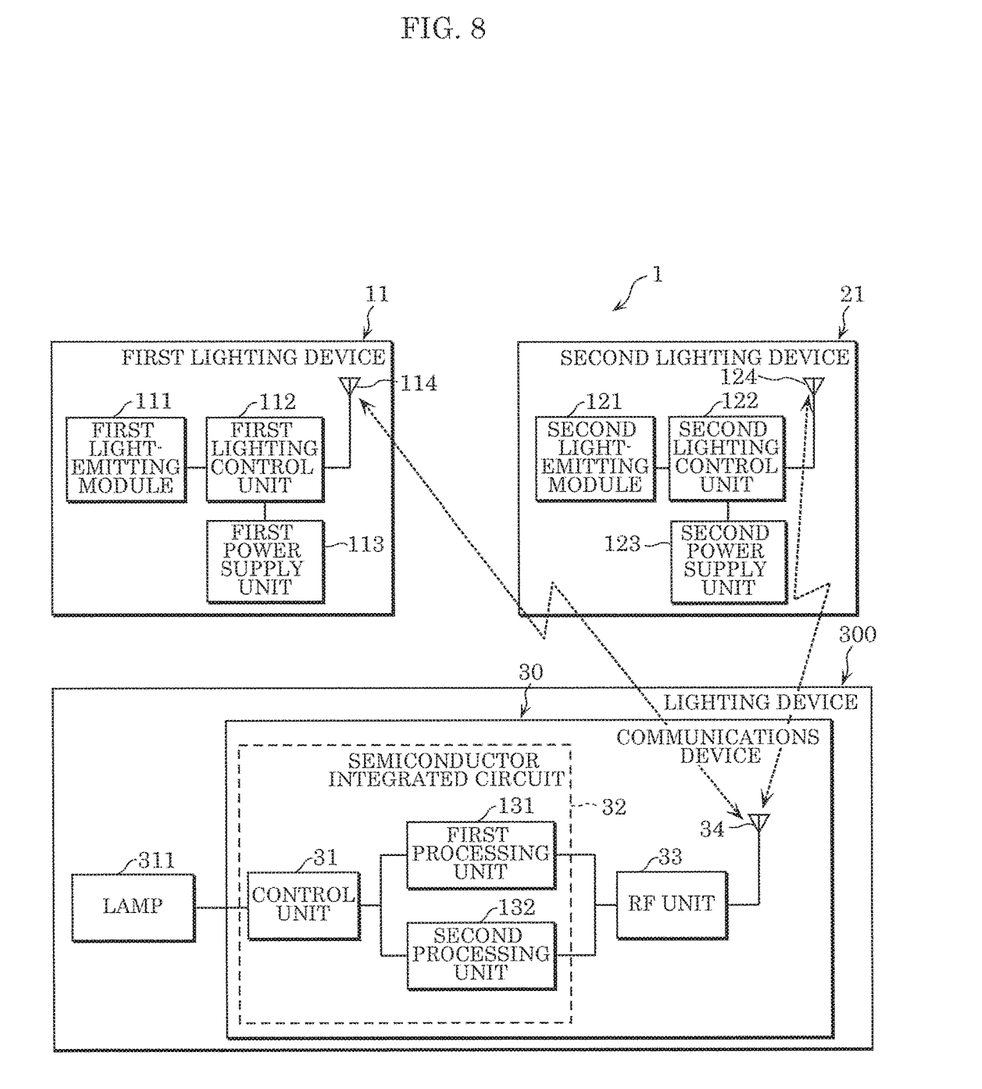
FIG. 8 schematically illustrates a lighting system according to an embodiment.

FIG. 8 schematically illustrates lighting system 1 according to this embodiment. As illustrated in FIG. 8, lighting system 1 according to this embodiment includes: lighting device 300 that includes communications device 30 and lamp 311 that emits light that illuminates a surrounding area; one or more first devices each of which is first lighting device 11, and one or more second devices each of which is second lighting device 21. Here, lamp 311 may include a light-emitting module that emits the light that illuminates the surrounding area, a lighting controller that controls emission of light by the light-emitting module, and a power supply unit that supplies power to the lighting controller.

(Other Variations, Etc.)

Hereinbefore, the present disclosure has been described based on an embodiment, but the present disclosure is not limited to the communications device described above.

For example, in the communications device according to the above embodiment, the control unit is exemplified as, but not limited to, being connected to the first processing unit and the second processing unit in the semiconductor integrated circuit in FIG. 2; the control unit may be connected to the RF unit. In such cases, it is possible to obtain control commands from the RF unit.

Moreover, in the lighting system according to the above embodiment, when there are a plurality of routes from the communications device to the end node, a route with the highest TTL hop count value at the end node may be selected. More specifically, when the configuration in FIG.

3A is reconfigured such that communications device 30 can directly wirelessly communicate with both second lighting device 21a and second lighting device 21b, two possible routes include a first route from communications device 30 to second lighting device 21a and then to second lighting device 21b, and a second route from communications device 30 to second lighting device 21b. The first route has a hop count value of 0 at the end node, but the second route has a hop count value of 1 at the end node. In this case, lighting system 1 selects the second route.

Moreover, in the communications device according to the above embodiment, a buffer may be provided between (i) first processing unit and second processing unit and (ii) the RF unit. The buffer may temporarily store information received from one or more first lighting devices until it is to be forwarded to one or more second lighting devices, and upon being transmitted to one or more second lighting devices, the information may be deleted from the buffer. Similarly, the buffer may temporarily store information received from one or more second lighting devices until it is to be forwarded to one or more first lighting devices, and upon being transmitted to one or more first lighting devices, the information may be deleted from the buffer.

Moreover, each component included in the communications device according to the above embodiments are generally realized as an LSI circuit, which is an integrated circuit. Each of these components may be individually realized as a single chip, or a portion or all of the processing units may be realized as a single chip.

Moreover, circuit integration is not limited to LSI, the processing units may be realized as a dedicated circuit or generic processor. A field programmable gate array (FPGA) that is programmable after manufacturing of the LSI circuit, or a reconfigurable processor whose connections and settings regarding circuit cells in the LSI circuit are reconfigurable, may be used.

One or more of the elements in the above embodiment may be configured from dedicated hardware, or may be realized by executing a software program suitable for the element. One or more of the elements may be realized by means of a program executing unit, such as a CPU and a processor, reading and executing the software program recorded on a recording medium such as a hard disk or a semiconductor memory.

Moreover, all of the values used above are mere examples presented for illustratively describing the present disclosure in detail; the embodiments of the present disclosure are not limited to the exemplary values.

Moreover, the block diagrams illustrate one example of the division of functional blocks; a plurality of functional blocks may be realized as a single functional block, a single functional block may be broken up into a plurality of functional blocks, and part of one function may be transferred to another functional block. Moreover, the functions of a plurality of function blocks having similar functions may be processed by a single piece of hardware or software in parallel or by time-division.

Moreover, the sequence in which the steps are executed in the flow charts are mere examples presented for illustratively describing the present disclosure in detail; the steps may be executing in a different order. Moreover, some of the steps may be executed at the same time as (in parallel with) other steps.

Embodiments arrived at by a person skilled in the art making various modifications to any one of the above embodiments as well as embodiments realized by arbitrarily combining structural components and functions in Embodiments 1 and 2 which do not depart from the essence of the present disclosure are included in the present disclosure.

What is claimed is:

1. A communications device that relays information between a start node among one or more first devices included in a first local network and an end node among one or more second devices included in a second local network different from the first local network, the communications device comprising:
   a first processor configured to wirelessly communicate with the one or more first devices via a first communications protocol;
   a second processor configured to wirelessly communicate with the one or more second devices via a second communications protocol different from the first communications protocol; and
   a controller configured to switch between causing the first processor to wirelessly communicate with the one or more first devices and causing the second processor to wirelessly communicate with the one or more second devices.

2. The communications device according to claim 1, wherein
   the controller is further configured to:
      relay, to the second local network, first information including a time to live (TTL) hop count value and a TTL default value obtained from the first local network; and
      relay, to the start node, second information including a TTL hop count value obtained from the second local network, the TTL hop count value being reset to the TTL default value at the end node.

3. The communications device according to claim 1, wherein
   the controller is configured to establish a route between the start node and the end node when power in the communications device is switched from off to on or from on to off.

4. The communications device according to claim 1, wherein
   the controller is configured to determine whether an established route between the start node and the end node is intact at a predetermined interval, and when the established route is not intact, is configured to reestablish a route between the start node and the end node.

5. The communications device according to claim 1, wherein
   the first local network is a network in which a route from the start node to the communications device is currently established, and
   the second local network is a network in which a route from the communications device to the end node is not currently established.

6. The communications device according to claim 1, wherein
   the first communications protocol is ZigBee, and
   the second communications protocol is Bluetooth.

7. The communications device according to claim 1, wherein
   the controller is configured to perform wireless communication using the first processor and perform wireless communication using the second processor temporally mutually exclusively.

8. A communications device that relays information between a start node among one or more first devices included in a first mesh network and an end node among one or more second devices included in a second mesh network different from the first mesh network, the communications device comprising:
- a first processor configured to wirelessly communicate with the one or more first devices via a first communications protocol;
- a second processor configured to wirelessly communicate with the one or more second devices via a second communications protocol different from the first communications protocol; and
- a controller configured to switch between causing the first processor to wirelessly communicate with the one or more first devices and causing the second processor to wirelessly communicate with the one or more second devices.

9. A communications system, comprising:

the communications device according to claim 1;

the one or more first devices; and the one or more second devices.

10. A lighting system, comprising:

a lighting device including the communications device according to claim 1 and a lamp that emits light that illuminates a surrounding area;

the one or more first devices, wherein each of the one or more first devices is a first lighting device; and the one or more second devices, wherein each of the one or more second devices is a second lighting device.

* * * * *